J. L. PRATHER.
STEERING WHEEL.
APPLICATION FILED SEPT. 7, 1909.
1,026,122.
Patented May 14, 1912.
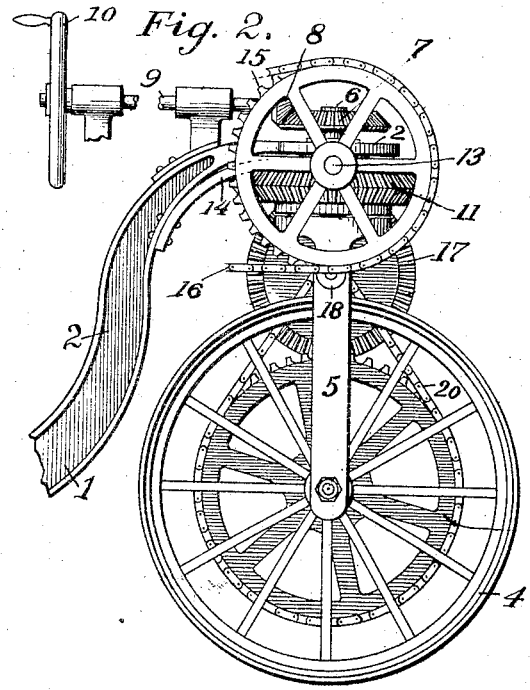
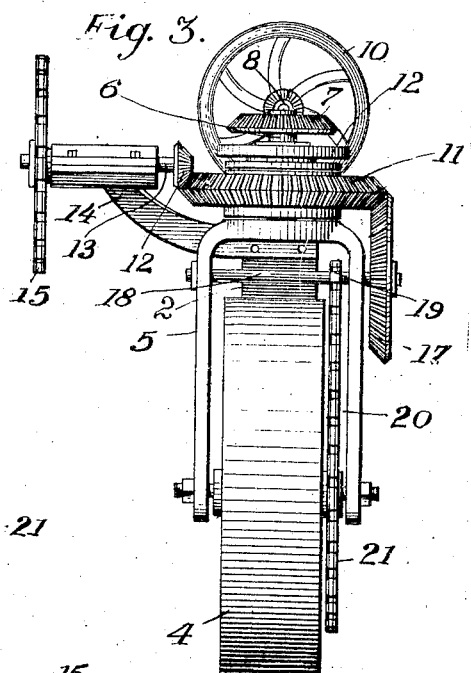
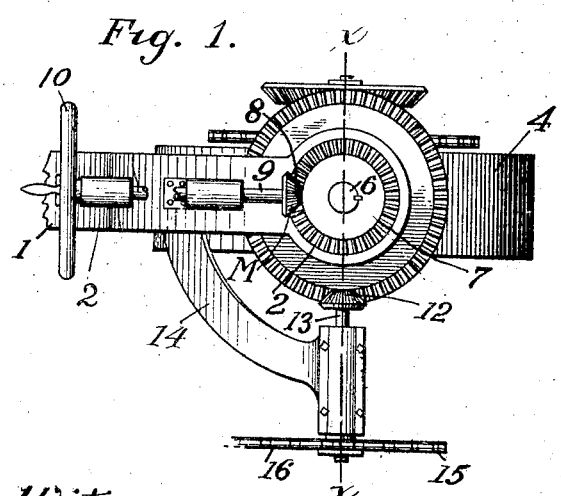
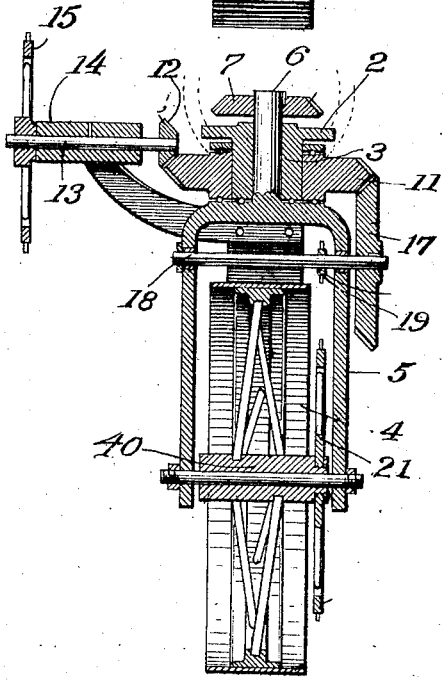
Witnesses:
W. L. Collins
D. E. Prather
Inventor:
Joseph L. Prather

UNITED STATES PATENT OFFICE.

JOSEPH L. PRATHER, OF FRESNO, CALIFORNIA.

STEERING-WHEEL.

1,026,122.   Specification of Letters Patent.   Patented May 14, 1912.

Application filed September 7, 1909.   Serial No. 516,577.

*To all whom it may concern:*

Be it known that I, JOSEPH L. PRATHER, a citizen of the United States, residing at Fresno, in the county of Fresno, State of California, have invented certain new and useful Improvements in Steering-Wheels; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in steering wheels of all kinds, particularly for plows or like implements, the object of the invention being to produce a steering wheel which can be turned in any direction desired and still be propelled and driven by the power operating the vehicle or implement to which it is attached.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a top plan view of my improved steering wheel. Fig. 2 is a side elevation of the same. Fig. 3 is a front elevation of the same. Fig. 4 is a sectional view taken on a line *x—x* of Fig. 1.

Referring now more particularly to the characters of reference on the drawings, 1 designates a portion of the frame of the vehicle to which my improved steering wheel is attached. This frame has a supporting plate 2 at its outer end, carrying a shaft or pin 3.

4 is a steering wheel mounted in a frame 5, having an upwardly extending pin 6 projecting through the member 3, and having on its upper end a beveled gear 7, with which intermeshes a small beveled gear 8 on a shaft 9, having a steering wheel 10 whereby the wheel 4 may be turned in any direction desired.

Disposed around the member 3 is a double faced beveled gear 11 with the upper face of which intermeshes a small sprocket wheel 12 on a shaft 13 journaled in a frame 14 secured to the frame 1. On the other end of the shaft 13 is a sprocket wheel 15 driven by a chain 16 connected with the power operating the vehicle to which the steering wheel is attached. Intermeshing with the under face of the gear 11 is a beveled gear 17 driving a shaft 18 journaled in the frame 5. On this shaft 18 is a sprocket wheel 19 connected by a chain 20 with the sprocket wheel 21 mounted on the hub 4ª of the wheel 4.

From the foregoing description it will readily be seen that the wheel 4 may be turned in any direction desired by means of the steering apparatus described and still be driven forward by means of the gear mechanism described herein, thus fulfilling the objects of the invention as hereinbefore stated.

While this specification sets forth in detail the present and preferred construction of the device, still in practice such deviations from such detail may be resorted to as do not form a departure from the spirit of the invention.

Having thus described my invention what I claim as new and useful, and desire to secure by Letters Patent is:—

A steering wheel as described comprising a frame, a projecting arm on said frame, another frame, a pin in said second frame projecting through the said first named frame, a beveled gear on the top of said pin, a frame secured to the first named frame, a shaft on said third named frame, a beveled gear on one end of said shaft engaging the beveled gear on said pin, a steering wheel on the other end of said shaft, a pin on said first named frame, a two faced beveled gear disposed around said pin and bearing on said second named frame, a shaft in said arm, a beveled gear on one end of said shaft engaging the upper face of said double faced beveled gear, a sprocket wheel on the other end of said shaft, a shaft disposed on said second named frame near the top thereof, a beveled gear on the end of said shaft engaging the under face of said doubled faced beveled gear, a sprocket wheel on said shaft, another shaft in the lower end of said named second frame, a wheel mounted on said last named shaft, a sprocket wheel connected with said last named wheel and a chain connecting the two last named sprocket wheels as described.

JOSEPH L. PRATHER.

Witnesses:
H. G. RHODES.
M. A. BARRICK.